United States Patent [19] [11] 3,957,745
Cassan [45] May 18, 1976

[54] FLAVORING AND FRAGRANCE COMPOSITIONS

[75] Inventor: Fernand Marcel Cassan, Grasse, France

[73] Assignee: Universal Oil Products Company, Des Plaines, Ill.

[22] Filed: July 25, 1974

[21] Appl. No.: 491,702

[52] U.S. Cl.................... 260/125; 260/128; 260/132; 260/139; 260/609 R; 426/131; 426/535; 426/531; 426/618; 426/652; 426/589; 426/615; 426/533
[51] Int. Cl.² ........................... C07G 17/00
[58] Field of Search ............ 426/65, 175, 221, 222, 426/342; 260/125, 128, 139, 132

[56] References Cited
UNITED STATES PATENTS

| | | | |
|---|---|---|---|
| 2,419,153 | 4/1947 | Musselman et al. | 260/125 |
| 2,553,588 | 5/1951 | Hughes | 260/125 |
| 3,457,277 | 7/1969 | Osborn et al. | 260/327 E |

*Primary Examiner*—Lewis Gotts
*Assistant Examiner*—D. R. Phillips
*Attorney, Agent, or Firm*—James R. Hoatson, Jr.; Raymond H. Nelson; William H. Page, II

[57] ABSTRACT

Flavor modifying compositions which alter or enhance naturally occurring substances are prepared by reacting a sulfur-containing compound with an alpha-hydroxy- or an alpha,beta-epoxy-substituted carbonyl compound.

9 Claims, No Drawings

FLAVORING AND FRAGRANCE COMPOSITIONS

This invention relates to compositions of matter which are useful in modifying or enhancing the flavor or fragrance of naturally occurring products. More specifically, the invention is concerned with compositions which alter, modify or enhance the flavor or aroma of various materials, the desired compositions being prepared by reacting a sulfur-containing compound with an alpha-hydroxy- or an alpha,beta-epoxy-substituted carbonyl compound of the type hereinafter set forth in greater detail. In Naturally occurring products which include foodstuffs or fragrances may have the flavor or fragrance thereof modified by incorporating therewith an effective amount of a novel composition of matter which comprises the product resulting from the reaction between a sulfur-containing compound and an alpha-hydroxy- or alpha,beta-epoxy-substituted carbonyl compound. The term "foodstuffs" as used in the specification and appended claims will include both solid and liquid materials such as meats including beef, pork, lamb, and varieties thereof including veal, ham, bacon, etc., soups, beverages, dairy products, vegetables such as mushrooms, soybeans, carrots, peas, cereals, etc. in addition, the term "foodstuffs" will also encompass tobacco. Other naturally occurring products will include various compounds which are utilized to impart fragrances to various compositions such as perfume compositions. The perfume compositions to which the flavor or fragrance modifying composition of the present invention may be added will usually comprise a mixture of organic compounds such as alcohols, aldehydes, ketones, nitriles, esters, hydrocarbons, etc. which are combined in such a manner so as to produce a fragrance which is pleasing to note or smell. As is known in the perfume industry, the perfume compositions will comprise a mixture of the main note, a fixitive and top notes. As will hereinafter be shown in greater detail, by utilizing the composition of matter prepared according to the process of the present invention, it will be possible to enhance the particular fragrance whereby the finished product will possess a pleasing note which is either more intense, fresher, etc. These fragrant compositions may then be used as the olfactory ingredients which are present in finished products such as soaps, detergents, perfumes, colognes, toilet water, bath oil, bath salts, hand lotions, cleaners, powders, shampoos, pomades, etc.

When used as a flavor modifying composition for the foodstuffs, the novel compositions of matter of the present invention will impart desirable flavor characteristics to enhance the flavor of the foodstuffs hereinbefore set forth or impart a desirable flavor to foodstuffs which may, by themselves, be relatively bland or tasteless by nature.

The thus treated foodstuffs will have the falvor modified by the addition of these novel compositions of matter whereby the treated foodstuff will then be acceptable for normal use. In addition to supplying a flavor characteristic to the bland or tasteless foodstuff, it is also possible to sharpen or augment an exiting flavor if the existing flavor is deficient in some aspect.

As hereinbefore set forth, in addition to being useful as flavor modifiers for foodstuffs such as meats, vegetables, it is also contemplated within the scope of this invention that the novel compositions of matter may also be used as additives for tobacco or tobacco-like products such as burley or other domestic tobacco, the foreign tobaccos such as Turkish tobacco, latakia, etc., these tobaccos being used for cigars, cigarettes, pipes, snuff, chewing tobacco, etc., whereby the flavor of the tobacco may be enhanced or altered to provide various and sundry flavors or fragrances to the tobacco.

It is therefore an object of this invention to provide novel compositions of matter which are useful in modifying flavors or fragrances of naturally occurring products.

A further object of this invention is to provide a method or process for the preparation of flavor modifying compositions of matter.

In one aspect an embodiment of this invention resides in a flavor modifying composition comprising the product resulting from the reaction between a sulfur-containing compound and an alpha-hydroxy- or an alpha,beta-epoxy-substituted carbonyl compound.

Another embodiment of this invention is found in a process for the preparation of a flavor modifying composition which comprises reacting a sulfur-containing compound with an alpha-hydroxy- or an alpha,beta-epoxy-substituted carbonyl compound at a temperature in the range of from about 65° to about 200° C. and a pressure in the range of from about atmospheric to about 100 atmospheres, and recovering the resultant product.

Yet another embodiment resides in a method of enhancing the flavor of naturally occurring products which comprises adding thereto an effective amount of a flavor modifying composition comprising the product resulting from the reaction between a sulfur-containing compound and an alpha-hydroxy- or an alpha,beta-epoxy-substituted carbonyl compound.

A specific embodiment of this invention resides in a novel flavor modifying composition which comprises the reaction product between sodium sulfhydrate and butyroin.

Another specific embodiment of this invention is found in a process for the preparation of a flavor modifying composition which comprises reacting cystein and butyroin at a temperature in the range of from about 65° to about 200° C. and a pressure in the range of from atmospheric to about 100 atmospheres in the presence of a polar solvent, and recovering the resultant product.

Yet another specific embodiment of this invention is found in a method of enhancing the flavor of a naturally occurring product such as a foodstuff which comprises adding thereto an effective amount of the product resulting from the reaction between ammonium sulfide and 3-hydroxy-3-methyl-2-butanone.

Other objects and embodiments will be found in the following further detailed description of the present invention.

As hereinbefore set forth the present invention is concerned with novel compositions of matter which are useful for modifying the flavor of naturally occurring products and to a method for the preparation thereof. The novel compositions of matter comprise the product resulting from the reaction between a sulfur-containing compound and an alpha-hydroxy- or an alpha,-beta-epoxy-substituted carbonyl compound. The process is effected by reacting the aforesaid compounds, which are hereinafter described in greater detail, in a solvent medium at elevated temperatures in a range of from about 65° to about 200° C. and a pressure in the range of from about atmospheric to about 100 atmospheres. The specific reaction parameters of temperature and pressure will be dependent upon the particular compounds which are undergoing reaction. For example, when using relatively volatile compounds which are in gaseous form, it is contemplated within the scope of this invention that the process will be effected at superatmospheric pressures, while when utilizing other compounds which are non-volatile in nature such as liquids it is preferred that the reaction be effected at atmospheric pressure. The superatmospheric pressures which are employed in certain of the reactions may be afforded by the pressure of the reactant itself such as when hydrogen sulfide or methyl mercaptan comprises one of the reactants or, if so desired, the pressure may be afforded by the introduction of a substantially inert gas such as nitrogen, argon, helium, etc. into the reaction zone. Alternatively speaking, the reactants may be present in an amount so as to afford only a partial pressure, the remainder of the desired operating pressure being provided for by the inert gas. Another reaction variable comprises the ratio of sulfur-containing compound to the alpha-hydroxy- or alpha,beta-epoxy-substituted carbonyl compound. As in the case of the reaction conditions, the amount of sulfur-containing compound will vary according to which particular compound is utilized. For example, when using sulfur-containing compounds such as hydrogen sulfide, methyl mercaptan, ethyl mercaptan, etc., it is possible to have this compound present in the reaction zone in a mole excess over that of the alpha-hydroxy- or alpha,beta-epoxy-substituted carbonyl compound. Conversely speaking, when using other sulfur-containing compounds, it is preferred that the sulfur-containing compound be present in a mole ratio of less than 1 mole of sulfur-containing compound per mole of alpha-hydroxy- or alpha,beta-epoxy-substituted carbonyl compound. Therefore, it is contemplated within the scope of this invention that the sulfur-containing compound is present in the reaction zone in a mole ratio in the range of from about 0.5:1 up to about 5:1 or more moles of sulfur-containing compound per mole of alpha-hydroxy- or alpha,beta-epoxy-substituted carbonyl compound.

As hereinbefore set forth the process in which the sulfur-containing compound is reacted with the alpha-hydroxy- or alpha,beta-epoxy-substituted carbonyl compound is preferably effected in the presence of 1 or more polar solvents, specific examples of these solvents being water, methyl alcohol, ethyl alcohol, n-propyl alcohol, isopropyl alcohol, n-butyl alcohol, sec-butyl alcohol, propylene glycol, diethylene glycol, dipropylene glycol, glycerine, benzyl alcohol, etc. It is to be understood that the aforementioned solvents are only representative of the class of compounds which may be used and that the present invention is not necessarily limited thereto. The desired residence time during which the reaction is effected will also vary according to the particular reactants and solvent which are employed, said residence time varying from about 0.5 up to about 20 hours or more in duration.

The sulfur-containing compounds which constitute one component of the reaction mixture will comprise those compounds which contain at least one sulfur atom in the molecule. Some specific examples of sulfur-containing compounds which may be utilized will include organosulfur compounds including alkyl mercaptans in which the alkyl substituent contains from 1 to about 6 carbon atom such as methyl mercaptan, ethyl mercaptan, n-propyl mercaptan, isopropyl mercaptan, n-butyl mercaptan, sec-butyl mercaptan, t-butyl mercaptan, n-pentyl mercaptan, sec-pentyl mercaptan, n-hexyl mercaptan, the isomeric heptyl mercaptans, etc.; unsaturated mercaptans such as allyl mercaptan, crotonyl mercaptan, etc.; aromatic mercaptans such as thiophenol, o-tolyl mercaptan, m-tolyl mercaptan, p-tolyl mercaptan, benzyl mercaptan, etc.; heterocyclic mercaptans such as furfuryl mercaptan, 2-methylfurfuryl mercaptan, 3-methyl-furfuryl mercaptan, etc.; cycloalkyl mercaptans such as cyclobutyl mercaptan, cyclopentyl mercaptan, cyclohexyl mercaptan, cycloheptyl mercaptan, etc.; symmetric and unsymmetric sulfides and polysulfides including alkyl sulfides and polysulfides in which the alkyl radical contains from 1 to about 6 carbon atoms such as dimethyl sulfide, diethyl sulfide, di-n-propyl sulfide, diisopropyl sulfide, the isomeric dibutyl sulfides, dipentyl sulfides, dihexyl sulfides, methyl ethyl sulfide, methyl propyl sulfide, methyl butyl sulfide, methyl pentyl sulfide, ethyl propyl sulfide, ethyl butyl sulfide, ethyl pentyl sulfide, ethyl hexyl sulfide, dimethyl disulfide, diethyl disulfide, di-n-propyl disulfide, diisopropyl disulfide, the isomeric dibutyl disulfides, dipentyl disulfides, dihexyl disulfides, methyl ethyl disulfide, methyl propyl disulfide, methyl butyl disulfide, methyl pentyl disulfide, ethyl propyl disulfide, ethyl butyl disulfide, ethyl pentyl disulfide, ethyl hexyl disulfide, dimethyl trisulfide, diethyl trisulfide, di-n-propyl trisulfide, diiospropyl trisulfide, the isomeric dibutyl trisulfides, dipentyl trisulfides, dihexyl trisulfides, methyl ethyl trisulfide, methyl propyl trisulfide, methyl butyl trisulfide, methyl pentyl trisulfide, ethyl propyl trisulfide, ethyl butyl trisulfide, ethyl pentyl trisulfide, ethyl hexyl trisulfide, etc,; organosulfur-containing acids such as methanesulfonic acid, ethanesulfonic acid, benzylsulfonic acid, toluenesulfonic acid, cysteine, cystine, methionine, etc,; inorganic sulfur-containing compounds such as hydrogen sulfide, sodium sulfide, potassium sulfide, lithium sulfide, rubidium sulfide, cesium sulfide, magnesium sulfide, calcium sulfide, strontium sulfide, barium sulfide, ammonium sulfide, sodium sulfhydrate, potassium sulfhydrate, lithium sulfhydrate, calcium sulfhydrate, etc. It is to be understood that the aforementioned sulfur-containing compounds are only representative of the class of compounds which may be used as one component to prepare a novel flavor or perfume modifying composition of matter in the process of the present invention and that said invention is not necessarily limited thereto.

Examples of alpha-hydroxy- or alpha,beta-epoxy-substituted carbonyl compounds which are reacted with sulfur-containing compounds hereinbefore set forth in greater detail will possess the generic formula:

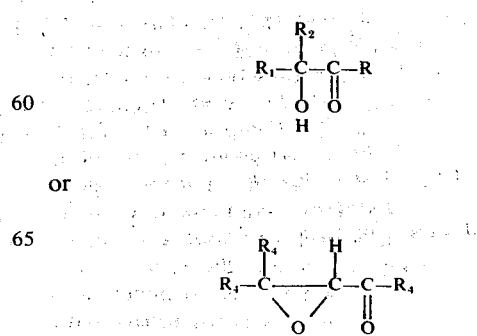

in which R and $R_1$ are selected from the group consisting of hydrogen, alkyl, both normal and branched chain in configuration of from 1 to about 6 carbon atoms, furan, thiophene, pyrolle, pyridine, pyran, thiapyran, 1,3-dioxane, 1,4-dioxane, pyrazine, pyrimidine, pyridazine and

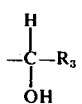

radicals, $R_3$ being hydrogen or alkyl of from 1 to about 6 carbon atoms, and $R_2$ and $R_4$ are independently selected from the group consistng of hydrogen and alkyl radicals containing from 1 to about 6 carbon atoms. Some specific examples of these compounds will include 3-hydroxy-2-butanone, 2-hydroxypropionaldehyde, 2-hydroxybutyraldehyde, 2-hydroxyamylaldehyde, 2-hydroxyhexaldehyde, 2-hydroxyheptaldehyde, 3-hydroxy-2-pentanone, 3-hydroxy-2-hexanone, 3-hydroxy-2-heptanone, 4-hydroxy-3-hexanone, 4-hydroxy-3-heptanone, 4-hydroxy-3-octanone, 3,4-dihydroxy-2-pentanone, 3,4-dihydroxy-2-hexanone, 3,4-dihydroxy-2-heptanone, 1,3-dihydroxy-2-propanone, 1,3-dihydroxy-2-butanone, 1,3-dihydroxy-2-pentanone, 1,3-dihydroxy-2-hexanone, 1,3-dihydroxy-2-heptanone, 3-hydroxy-3-methyl-2-butanone, 3-hydroxy-3-methyl-2-pentanone, 3-hydroxy-3-methyl-2-hexanone, 2-formyl-2-hydroxyacetaldehyde, 2-thiophenyl-2-hydroxyacetaldehyde, 2-pyridinyl-2-hydroxyacetaldehyde, 2-pyranyl-2-hydroxyacetaldehyde, 2-pyrimidinyl-2-hydroxyacetaldehyde, 2-thiapyranyl-2-hydroxylacetaldehyde, 3-thienyl-3-hydroxy-2-butanone, 3-pyrimidinyl-3-hydroxy-2-butanone, 3-pyranyl-3-hydroxy-2-butanone, 3-formyl-2-hydroxypropionaldehyde, 3-thiophenyl-2-hydroxypropionaldehyde, 3-pyridinyl-2-hydroxypropionaldehyde, 3-pyranyl-2-hydroxypropionaldehyde, 3pyrimidinyl-2-hydroxypropionaldehyde, 3-thiapyranyl-2-hydroxypropionaldehyde, 4-formyl-2-hydroxybutyraldehyde, 4-thiophenyl-2-hydroxybutyraldehyde, 4-pyridinyl-2-hydroxybutyraldehyde, 4-pyranyl-2-hydroxybutyraldehyde, 4-pyrimidinyl-2-hydroxybutyraldehyde, 4-thiapyranyl-2-hydroxybutyraldehyde, 4-formyl-3-hydroxy-2-butanone, 4-thiophenyl-1,3-dihydroxy-2-butanone, 4-pyridinyl-1,3-dihydroxy-2-butanone, 4-pyramyl-1,3-dihydroxy-2-butanone, 4-pyrimidinyl-1,3-dihydroxy-2-butanone, 4-thiapyranyl-1,3-dihydroxy-2-butanone, 5-formlyl-3-hydroxy-2-pentanone, 5-thienyl-3-hydroxy-2-pentanone, 5-pyridinyl-3-hydroxy-2-pentanone, 5-pyranyl-3-hydroxy-2-pentanone, 5-pyrimidinyl-3-hydroxy-2-pentanone, 5-thiapyranyl-3-hydroxy-2-pentanone, 3-formyl-1,3-dihydroxy-2-propanones, 3-thienyl-1,3-dihydroxy-2-propanone, 3-pyridinyl-1,3-dihydroxy-2-propanone, 3-pyranyl-1,3-dihydroxy-2-propanone, 3-pyrimidinyl-1,3-dihydroxy-2-propanone, 3-thiapyranyl-1,3-dihydroxy-2-propanone, etc., 2,3-epoxypropionaldehyde, 2,3-epoxybutyraldehyde, 2,3-epoxyamylaldehyde, 2,3-epoxyhexaldehyde, 2,3-epoxyheptaldehyde, 3,4-epoxy-2-butanone, 3,4-epoxy-2-pentanone, 3,4-epoxy-2-hexanone, 3,4-epoxy-2-heptanone, 4,5-epoxy-3-hexanone, 4,5-epoxy-3-heptanone, 4,5-epoxy-3-octanone, 4-methyl-3,4-epoxy-2-pentanone, 4-methyl-3,4-epoxy-2-hexanone, 4-methyl-3,4-epoxy-2-heptanone, etc. It is to be understood that the aforementioned alpha-hydroxy-substituted and alpha,beta-epoxy-substituted carbonyl compounds are only representative of the class of compounds which may be used as one of the substituents in the reaction of the present invention, and that said invention is not necessarily limited thereto.

The process of the present invention in which novel fragrance or flavor modifying compositions are prepared may be effected in any suitable manner and may comprise either a batch or continuous type operation. When a batch type operation is used, the particular apparatus which is selected will, of necessity, depend upon whether the reaction is to be effected at atmospheric or superatmospheric pressures. When atmospheric pressures are used, the apparatus may comprise a flask which is provided with reflux means, stirring and heating means. A quantity of the sulfur-containing compound and the alpha-hydroxy-substituted or alpha,beta-epoxy-substituted carbonyl compound is placed in the reactor along with the particular solvent which is to be employed. In the preferred embodiment of the invention the solvent is present in an amount in the range of from about 2 to about 500 parts by weight of the reactants. In addition, the amount of the reactants in a weight ratio will be dependent upon the partcular reactants employed, the sulfur-containing compound being present in either a molar excess or mole deficiency over the alpha-hydroxy-substituted or alpha,beta-epoxy-substituted carbonyl compound. The reaction is then heated to the desired operating temperature which will be in the range hereinbefore set forth and maintained thereat for a predetermined residence time. At the end of the desired residence time, the reaction mixture is allowed to cool to room temperature and treated in any manner known in the art whereby the desired product is separated and recovered from any unreacted starting materials, said treating means including washing, drying, filtration, extraction, fractional distillaton, etc. When superatmospheric pressures are to be employed to effect the reaction between the sulfur-containing compound and the alpha-hydroxy- or alpha,beta-epoxy-substituted carbonyl compound, the preferred apparatus will comprise an autoclave of the rotating or mixing type. When this type of reaction is effected, a quantity of the starting materials is placed in the apparatus along with the solvent or mixture of solvents of a type previously determined. In the event that the sulfur-containing compound is in gaseous form, such as when using hydrogen sulfide, methyl mercaptan, etc., it is possible to place only the alpha-hydroxy- or alpha,beta-epoxy-substituted carbonyl compound in the reactor which is thereafter sealed and the sulfur-containing compound is then charged thereto until the desired operating pressure is reached. Alternatively speaking, the sulfur-containing compound and the alpha-hydroxy-substituted or alpha,beta-epoxy-substituted carbonyl compound may both be placed in the autoclave which is thereafter sealed and the desired operating pressure is effected by introducing a substantially inert gas such as nitrogen into said autoclave. When the desired operating pressure has been attained, the autoclave and contents thereof are then heated to the desired operating temperature and maintained thereat for a predetermined residence time. At the end of this time, heating is discontinued, the autoclave is allowed to return to room temperature and the excess pressure is vented. The autoclave is opened and the reaction mixture is recovered therefrom. After being subjected to conventional means of separation similar in nature to those hereinbefore set forth, the desired novel flavor modifying composition of matter is recovered.

It is also contemplated within the scope of this invention that the desired products of the present invention may be prepared by utilizing a continuous manner of operation. When such a type of operation is used, the starting material containing the sulfur-containing compound and the alpha-hydroxy-substituted or alpha,-beta-epoxy-substituted carbonyl compound are continuously charged to a reaction zone which is maintained at the proper operating conditions of temperature and pressure. The polar solvent in which the reaction is effected is also continuously charged to the reactor through a separate line or, if so desired, the solvent may be admixed with one or both of the starting materials and the resulting mixture charged to the reactor in a single stream. After passage through the reactor for a predetermined reaction time, the reactor effluent is continuously withdrawn and subjected to separation means which are also similar to those hereinbefore set forth. The unreacted starting materials and solvent are separated from any unwanted side reactions which may have occurred and recycled to the reactor to form a portion of the feed stream while the desired product which results from the reaction between the sulfur-containing compound and the alpha-hydroxy-substituted or alpha,beta-epoxy-substituted carbonyl compound is withdrawn for storage.

The products which result from the reaction between the sulfur-containing compound and the alpha-hydroxy- or alpha,beta-epoxy-substituted carbonyl compound which comprise novel flavor modifying compositions of matter may be used to modify, alter or enhance the flavor or foodstuffs, tobaccos or perfume compositions in any manner. For example, when these compositions of matter are used to modify the flavor of foodstuffs they may be added to said foodstuffs in the original mixture or single component of the foodstuff prior to subjecting the foodstuff to cooking means whether by baking, frying, roasting, etc. It is also contemplated within the scope of this invention that the flavor modifying compositions of matter may be added in a step subsequent to the application of heat to the foodstuff if the composition of matter is relatively volatile in nature and would therefore tend to be destroyed during the cooking process. Likewise, when utilized to modify the flavor of tobacco, the flavor modifying composition of matter may be added to the tobacco in any suitable manner at a stage prior to curing or at a stage subsequent thereto, the application of the flavor modifying composition of matter being accomplished by spraying, dipping or any other method known in the art. Likewise, when utilized to modify or enhance the flavor of a perfume composition, the flavor modifying product may be added at any stage during the compounding of the mixture prior to reaching the ultimate perfume composition. Generally speaking, the flavor modifying composition of matter may be used in the foodstuff, tobacco or perfume composition in a relatively wide range of percentages, the percentage of the flavor modifying composition of matter in the naturally occurring product being in a range of from about 0.001% up to about 50% or more, the amount of the flavor modifying composition of matter which is present in the product being dependent upon many variables including cost, nature of the end product, the particular effect which is to be desired, such as alterations, modifications, enhancements, etc.

The following examples are given to illustrate a method for the preparation of the flavor modifying compositions of matter as well as the novel flavor modifying compositions of matter of the present invention. However, it is to be understood that these subsequent examples are given merely for purposes of illustration and that the present invention is not designed to be restricted thereto.

EXAMPLE I

As an example of the preparation of the flavor modifying composition of matter 1 gram of butyroin, 0.5 grams of sodium sulfhydrate and 48.5 grams of propylene glycol were placed in a 250 cc. reaction flask which was fitted with reflux means, a magnetic stirrer, and a thermometer. The reaction mixture was heated to a temperature of 150° C. for a period of 1 hour while agitating the mixture by means of the stirrer. The color of the reaction mixture changed from yellow to green and back to yellow during the 1-hour residence time. After completion of the 1-hour period, heating was discontinued and the mixture allowed to return to room temperature. Upon reaching room temperature, concentrated hydrochloric acid was added to neutralize the sodium sulfhydrate, following which a current of nitrogen was bubbled through the reaction mixture for a period of 2 hours to purge any traces of hydrogen sulfide which still remained. Following this the reaction mixture was filtered, the solid was removed and the liquid product resulting from the reaction between the butyroin and sodium sulfhydrate was recovered. The product had an odor of tarragon and minced meat, and in addition there was also detected a fruit-like odor resembling a grapefruit note.

EXAMPLE II

In like manner, another flavor modifying composition of matter was prepared by admixing 1 gram of butyroin, 1 gram of cystein and 48 grams of propylene glycol in a 250 cc. reaction flask which was provided with reflux means, a magnetic stirrer and a thermometer. The reaction mixture was stirred and heated to a temperature of 150° C. After maintaining the reaction mixture at this temperature for a period of 2 hours, heating was discontinued and the mixture was allowed to return to room temperature. The unreacted cystein and propylene glycol were separated from the reaction product, said product being light yellow in color with an odor of rumpled leaves.

EXAMPLE III

In this example 4.1 grams of sodium hydroxide and 16.3 grams of distilled water were placed in a 100 cc. reaction flask provided with a magnetic stirrer. The resulting mixture was stirred and thereafter 8 grams of butyl mercaptan was added in small incremental quantities, said butyl mercaptan dissolving rapidly in the sodium hydroxide solution. The resulting mercaptide solution was then recovered.

Following this, 1 gram of the mercaptide solution which was prepared according to the above paragraph along with 5 grams of 1,3-dihydroxy-2-propanone and 44 grams of distilled water were placed in a 250 cc. reaction flask provided with reflux means, magnetic stirrer and thermometer. The reaction mixture was then heated to the reflux temperature of water, stirred and maintained at this temperature for a period of 15 hours. At the end of this time, heating was discontinued and after the reaction product had returned to room temperature, it was treated with a sufficient amount of concentrated sulfuric acid to obtain a pH of 6.5. After reaching this pH a current of nitrogen was bubbled through the reaction mixture for a period of 4 hours. Thereafter the reaction mixture was filtered and the product which was obtained thereby possessed the odor and taste of roasted meat. In addition, there was also detected the odor and taste of fried onions.

EXAMPLE IV

In like manner 11.7 grams of 3-hydroxy-3-methyl-2-butanone and 10 grams of a 20% ammonium sulfide solution along with 26 grams of propylene glycol were placed in a reaction flask provided with means similar to that set forth in the above examples. The mixture was heated to the reflux temperature of the water and maintained thereat for 15 hours, the color of the mixture changing from yellow to deep green and then to light red-brown. At the end of the aforementioned time period, heating was discontinued and after reaching room temperature the reaction mixture was treated with concentrated hydrochloric acid in an amount sufficient to obtain a pH of 4, the addition of the hydrochloric acid being accompanied by continuous stirring. Thereafter a stream of nitrogen was bubbled through the reaction mixture to remove any traces of hydrogen sulfide for a period of 4 hours following which the reaction mixture was subjected to filtration, the product being separated from the solids and recovered, the novel flavor modifying composition of matter possessing an odor of meat.

EXAMPLE V

To obtain another example of the novel flavor modifying compositions of matter which may be obtained according to the process of the present invention, 48 grams of propylene glycol, 1.6 grams of 4-methyl-3,4-epoxy-2-pentanone and 0.5 grams of sodium sulfhydrate were added to a reaction flask provided with reflux means, magnetic stirrer and thermometer. The mixture was heated for a period of 15 minutes to a temperature of 150° C. and maintained thereat for an additional period of 15 minutes, the color of the mixture changing from red to deep red and thereafter to deep brown. At the end of the second 15-minute period, heating was discontinued and the reaction mixture allowed to return to room temperature. Upon reaching room temperature, the reaction mixture was treated with an amount of concentrated hydrochloric acid sufficient to bring the pH of the solution to 5, the addition of the hydrochloric acid being accompanied by continuous stirring. Thereafter a stream of nitrogen was bubbled through the reaction mixture for a period of 4 hours to remove any traces of residual hydrogen sulfide. At the end of this 4-hour period, the reaction mixture was filtered and the product resulting from the reaction between the sodium sulfhydrate and the 4-methyl-3,4-epoxy-2-pentanone was recovered. This product possessed a green herbaceous note similar to the black-currant bud aroma.

EXAMPLE VI

Yet another novel flavor modifying composition of matter was obtained by placing 1.6 grams of 2,3-epoxyheptaldehyde (2,3-epoxy-1-heptanal), 2.5 grams of a 20% aqueous ammonium sulfide solution and 46 grams of propylene glycol in a 250 cc. reaction flask provided with reflux means, magnetic stirrer and thermometer. The reaction mixture was heated to a temperature of 90° C. and maintained thereat for a period of 40 minutes, the reaction mixture being constantly stirred during this period. At the end of the 40-minute period, heating was discontinued and after reaching room temperature, the reaction mixture was treated with a sufficient amount of hydrochloric acid to obtain a pH of 6. When this pH was reached, a stream of nitrogen was allowed to bubble through the reaction mixture for a period of 1 hour to remove any traces of hydrogen sulfide which may have been present. Thereafter the reaction mixture was filtered and the product resulting from the reaction between the 2,3-epoxyheptaldehyde and ammonium sulfide was recovered. This product possessed a heavy note of mushrooms.

EXAMPLE VII

To illustrate the ability of the novel flavor modifying compositions of matter of the present invention to alter the flavor of naturally occurring products, a green pepper sauce was prepared by diluting 5 grams of a stabilizing agent with 10 grams of vegetable oil. This mixture was then poured into 800 grams of boiling water and allowed to boil for a period of 10 minutes. Following this, 12 grams of salt, 2 grams of dextrose, 1 gram of sodium glutamate, 10 grams of meat extract and 0.25 grams of black pepper oleoresin were added thereto. In a separate vessel 30 grams of corn starch was added to 100 grams of water and the resulting solution was poured into the boiling mixture previously prepared. Following this, 50 grams of cream was added to the end product. The resulting sauce was divided into two equal portions and 2 grams per 100 kilograms of sauce of the product prepared according to Example II above, that is, the product resulting from the reaction of 1 gram of butyroin and 1 gram of cystein was added to one portion of the sauce. The sauce was subjected to a taste test using a panel of qualified taste testers. This panel concluded that the novel flavor modifying composition of matter of the present invention strengthened the taste of the sauce and conferred a more aromatic note to the greep pepper sauce than that which is possessed by the sauce alone.

EXAMPLE VIII

As a further illustration of the ability of the novel compositions of matter of the present invention to enhance the fragrance of a perfume composition, a perfume composition possessing a lemon note was prepared by admixing 50 parts of 100% citral, 15 parts of linalyl acetate, 8 parts of terpinyl acetate, 1 part of geraniol, 1 part of geranyl acetate, 6 parts of a 10% solution of $C_8$ aldehyde in ethyl alcohol, 2 parts of a 10% solution of $C_9$ aldehyde in ethyl alcohol, 1 part of a 10% solution of methylnonylacetaldehyde in ethyl alcohol, 200 parts of Guinea lemon oil, 710 parts of orange terpines, 4 parts of ethyl acetate, 1 part of methyl anthranilate and 1 part of methyl heptenone. The resulting composition was again divided into two portions. To the first portion of the perfume composition was added 50 parts per thousand of ethyl alcohol while to the second portion of the perfume composition was added 50 parts per thousand of the product from the reaction between 1 gram of butyroin and 0.5 grams of sodium sulfhydrate, the preparation of which was described in Example I above. It was determined by an olfactory examination conducted by a panel of qualified personnel that the perfume composition which contained the novel flavor modifying composition of matter of the present invention possessed a fresher, greener and more peal-like note than was possessed by the perfume composition which did not contain the reaction product.

I claim as my invention:

1. A flavor modifying composition comprising the reaction product of a sulfur-containing compound selected from the group consisting of sodium sulfhydrate, cystein, butyl mercaptan and ammonium sulfide with a carbonyl compound selected from the group consisting of butyroin, 1,3-dihydroxy-2-propanone, 3-hydroxy-3-methyl-2-butanone, 4-methyl-3,4-epoxy-2-pentanone and 2,3-epoxyheptaldehyde (2,3-epoxy-1-heptanal).

2. The flavor modifying composition as set forth in claim 1 in which the sulfur-containing compound is sodium sulfhydrate and the carbonyl compound is butyroin.

3. The flavor modifying composition as set forth in claim 1 in which the sulfur-containing compound is cystein and the carbonyl compound is butyroin.

4. The flavor modifying composition as set forth in claim 1 in which the sulfur-containing compound is ammonium sulfide and the carbonyl compound is 3-hydroxy-3-methyl-2-butanone.

5. The flavor modifying composition as set forth in claim 1 in which the sulfur-containing compound is sodium sulfhydrate and the carbonyl compound is 4-methyl-3,4-epoxy-2-pentanone.

6. The flavor modifying composition as set forth in claim 1 in which the sulfur-containing compound is ammonium sulfide and the carbonyl compound is 2,3-epoxy-1-heptanal.

7. A process for the preparation of a flavor modifying composition which comprises reacting, at a temperature in the range of from about 65° to about 200° C. and a pressure in the range of from about atmospheric to about 100 atmospheres, a sulfur-containing compound selected from the group consisting of sodium sulfhydrate, cystein, butyl mercaptan and ammonium sulfide with a carbonyl compound selected from the group consisting of butyroin, 1,3-dihydroxy-2-propanone, 3-hydroxy-3-methyl-2-butanone, 4-methyl-3,4-epoxy-2-pentanone and 2,3-epoxyheptaldehyde (2,3-epoxy-1-heptanal).

8. The process as set forth in claim 7 in which said reaction is effected in the presence of a polar solvent.

9. The process as set forth in claim 7 in which said sulfur-containing compound is present in the reaction in a mole ratio of from about 0.5:1 to about 5:1 moles of sulfur compound per mole of carbonyl compound.

* * * * *